US012749630B2

(12) United States Patent
Liu et al.

(10) Patent No.: US 12,749,630 B2
(45) Date of Patent: Sep. 29, 2026

(54) ULTRACAPACITOR INCLUDING A SULFUR-BASED ELECTROLYTE SYSTEM

(71) Applicant: KYOCERA AVX Components Corporation, Fountain Inn, SC (US)

(72) Inventors: Xiaorong Liu, Simpsonville, SC (US); Michael Maich, Simpsonville, SC (US); Jonathan Robert Knopsnyder, Fountain Inn, SC (US); Bryan Caoile, Simpsonville, SC (US); Ken Brown, Simpsonville, SC (US); Laurent Desclos, San Diego, CA (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 138 days.

(21) Appl. No.: 18/919,517

(22) Filed: Oct. 18, 2024

(65) Prior Publication Data

US 2025/0132104 A1 Apr. 24, 2025

Related U.S. Application Data

(60) Provisional application No. 63/591,213, filed on Oct. 18, 2023.

(51) Int. Cl.
*H01G 11/60* (2013.01)
*H01G 11/28* (2013.01)
*H01G 11/62* (2013.01)

(52) U.S. Cl.
CPC ............ *H01G 11/60* (2013.01); *H01G 11/28* (2013.01); *H01G 11/62* (2013.01)

(58) Field of Classification Search
CPC ......... H01G 11/60; H01G 11/28; H01G 11/62
See application file for complete search history.

(56) References Cited

U.S. PATENT DOCUMENTS

| | | | | |
|---|---|---|---|---|
| 9,520,617 | B2 | 12/2016 | Cooper | |
| 9,583,272 | B2 * | 2/2017 | Oyama | H01G 11/60 |
| 9,742,033 | B2 | 8/2017 | Abe et al. | |
| 10,050,307 | B2 | 8/2018 | Abe et al. | |
| 11,830,672 | B2 | 11/2023 | Ritter et al. | |
| 12,230,442 | B2 | 2/2025 | Desclos | |
| 2011/0304952 | A1 * | 12/2011 | Lee | H01G 11/58 252/62.2 |

(Continued)

FOREIGN PATENT DOCUMENTS

| | | |
|---|---|---|
| CN | 101030661 B | 12/2011 |
| CN | 104867698 A | 8/2015 |

(Continued)

OTHER PUBLICATIONS

International Search Report and Written Opinion for PCT/US2024/051981 dated Jan. 31, 2025, 6 pages.

*Primary Examiner* — Michael P McFadden
(74) *Attorney, Agent, or Firm* — Dority & Manning, P..A.

(57) ABSTRACT

An electrolyte system and an ultracapacitor are disclosed. The electrolyte system comprises a solvent, an ionic liquid comprising a cyclic compound, and a lithium metal salt. The solvent comprises a first sulfur-containing compound in an amount of from less than 85 wt. % based on the weight of the solvent and a second sulfur-containing compound in an amount of 50 wt. % or less based on the weight of the solvent. An ultracapacitor may comprise the electrolyte system.

32 Claims, 3 Drawing Sheets

2000h performance at 65C/2.7V

(56) References Cited

U.S. PATENT DOCUMENTS

| | | | |
|---|---|---|---|
| 2012/0044614 | A1 | 2/2012 | Hommo et al. |
| 2013/0125979 | A1* | 5/2013 | Imawaka ............... H10K 30/88 156/60 |
| 2015/0029640 | A1 | 1/2015 | Ito et al. |
| 2016/0218394 | A1* | 7/2016 | Yamada .............. H01M 10/052 |
| 2017/0025231 | A1 | 1/2017 | Takahashi |
| 2017/0110260 | A1 | 4/2017 | Zheng et al. |
| 2018/0342737 | A1* | 11/2018 | Zhamu .................. H01M 4/625 |
| 2018/0351200 | A1* | 12/2018 | Zhamu .............. H01M 10/0565 |
| 2018/0351201 | A1* | 12/2018 | Zhamu .................. H01M 4/587 |
| 2019/0372186 | A1 | 12/2019 | Kong et al. |
| 2020/0099097 | A1* | 3/2020 | Li .......................... H01G 11/60 |
| 2021/0118627 | A1* | 4/2021 | Su .......................... H01G 11/60 |
| 2021/0202989 | A1 | 7/2021 | Lee et al. |
| 2021/0376382 | A1* | 12/2021 | Moganty ........... H01M 10/0569 |
| 2024/0421314 | A1 | 12/2024 | Li et al. |
| 2025/0015337 | A1 | 1/2025 | Tan et al. |

FOREIGN PATENT DOCUMENTS

| | | | |
|---|---|---|---|
| CN | 106785046 | A | 5/2017 |
| CN | 107910196 | A | 4/2018 |
| CN | 111916830 | A | 11/2020 |
| CN | 103208668 | A | 7/2023 |
| GB | 2606138 | A | 11/2022 |
| JP | 2008171902 | A | 7/2008 |
| JP | 2009123789 | A | 6/2009 |
| JP | 2013179204 | A | 9/2013 |
| JP | 2015122393 | A | 7/2015 |
| JP | 2017028274 | A | 2/2017 |
| KR | 20150040645 | A | 4/2015 |
| WO | WO 2006/059085 | A1 | 6/2006 |

* cited by examiner

3000h performance at 65C/2.7V

ULTRACAPACITOR INCLUDING A SULFUR-BASED ELECTROLYTE SYSTEM

CROSS-REFERENCE TO RELATED APPLICATION

The present application claims filing benefit of U.S. Provisional Patent Application Ser. No. 63/591,213 having a filing date of Oct. 18, 2023, and which is incorporated herein by reference in its entirety.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. Many conventional ultracapacitors include electrolyte systems that may only allow operation up to certain temperatures. As a result, utilization of such ultracapacitors within higher temperature environments may be detrimental to the effectiveness and lifespan of the ultracapacitor.

As such, a need currently exists for an improved electrolyte system and a corresponding ultracapacitor including the same.

SUMMARY OF THE INVENTION

In accordance with one embodiment of the present invention, an ultracapacitor is disclosed. The ultracapacitor comprises a housing and an electrode assembly and an electrolyte system within the housing. The electrolyte system comprises a solvent, an ionic liquid comprising a cyclic compound, and a lithium metal salt. The solvent comprises a first sulfur-containing compound in an amount of from less than 85 wt. % based on the weight of the solvent and a second sulfur-containing compound in an amount of 50 wt. % or less based on the weight of the solvent.

In accordance with another embodiment of the present invention, an electrolyte system is disclosed. The electrolyte system comprises a solvent, an ionic liquid comprising a cyclic compound, and a lithium metal salt. The solvent comprises a first sulfur-containing compound in an amount of from less than 85 wt. % based on the weight of the solvent and a second sulfur-containing compound in an amount of 50 wt. % or less based on the weight of the solvent.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

DETAILED DESCRIPTION OF REPRESENTATIVE EMBODIMENTS

Figure 1:
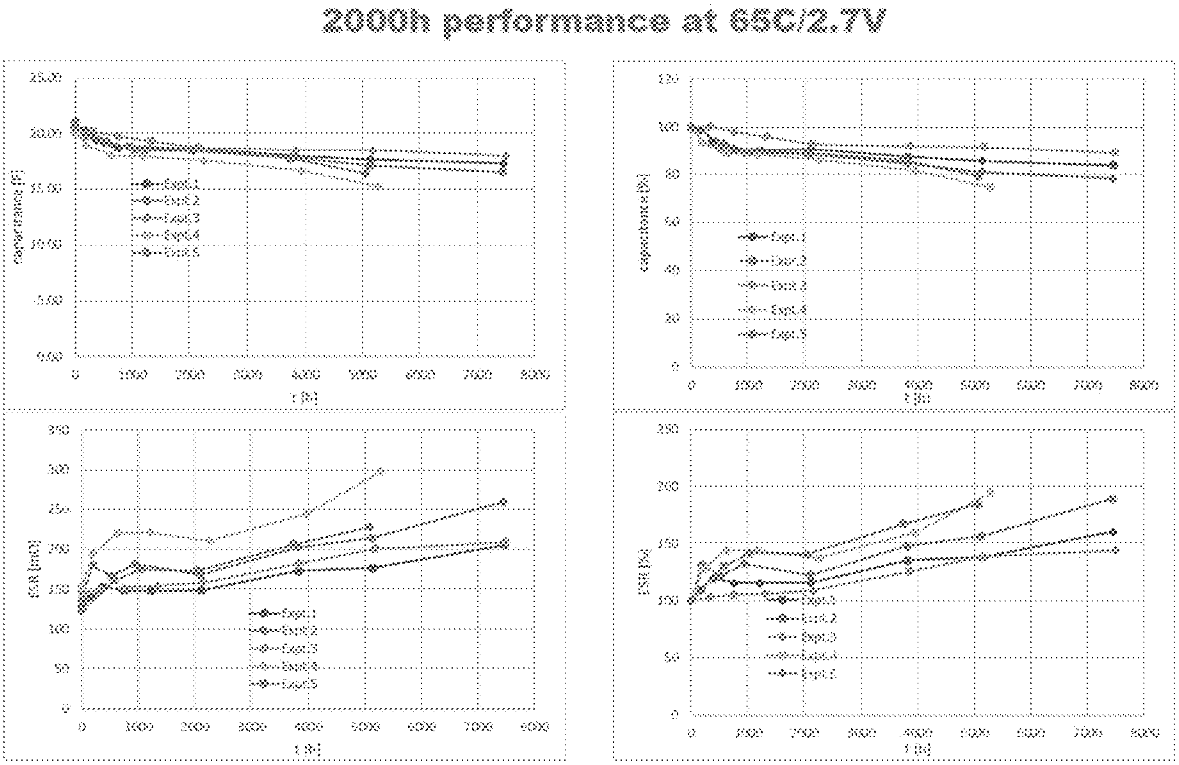
FIGS. 1-4 illustrate the capacitance and equivalent series resistance results of the first electrolyte system of Example 1.

It is to be understood by one of ordinary skill in the art that the present discussion is a description of exemplary embodiments only and is not intended as limiting the broader aspects of the present invention, which broader aspects are embodied in the exemplary construction.

Generally speaking, the present invention is directed to an improved electrolyte system and an ultracapacitor including an improved electrolyte system. The present inventors have discovered that by providing an electrolyte system as disclosed herein, an ultracapacitor having certain desired properties can be obtained. In particular, such properties may be realized at relatively high temperatures. In this regard, the ultracapacitor may have high heat resistance and durability and high withstand voltage due to the electrolyte system as disclosed therein.

Ultracapacitor

In general, the ultracapacitor includes a housing within which an electrode assembly and electrolyte system are retained and sealed. The ultracapacitor also includes terminals electrically connected to respective electrodes within the electrode assembly. For instance, in one embodiment, at least one external terminal may be provided on a top surface of the ultracapacitor while a second external terminal may be provided on a bottom surface of the ultracapacitor. In this regard, the external terminals extend from opposing ends of the electrode assembly and the ultracapacitor. In another embodiment, both external terminals may be provided on the same surface, such as the top surface, of the ultracapacitor. In this regard, the external terminals may extend from the same side of the electrode assembly and ultracapacitor.

Electrode Assembly

In general, the ultracapacitor contains an electrode assembly including a first electrode, a second electrode, and a separator. For instance, the first electrode typically includes a first electrode containing a first carbonaceous coating (e.g., activated carbon particles) electrically coupled to a first current collector, and a second electrode typically includes a second carbonaceous coating (e.g., activated carbon particles) electrically coupled to a second current collector. A separator may also be positioned between the first electrode and the second electrode. In addition, the ultracapacitor contains first and second terminals that are electrically connected to first and second electrodes, respectively.

Various embodiments of such an assembly are described in more detail below.

Electrodes

As indicated above, the ultracapacitor includes an electrode assembly including a first electrode and a second electrode. The electrodes employed within the assembly generally contain a current collector. The current collectors may be formed from the same or different materials. For instance, in one embodiment, the current collectors of each electrode are formed from the same material. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention.

The current collector substrate may be in the form of a foil, sheet, plate, mesh, etc. The substrate may also have a relatively small thickness, such as about 200 micrometers or less, such as about 150 micrometers or less, such as about 100 micrometers or less, such as about 80 micrometers or less, such as about 50 micrometers or less, such as about 40 micrometers or less, such as about 30 micrometers or less. The substrate may have a thickness of about 1 micrometer or more, such as about 5 micrometers or more, such as about 10 micrometers or more, such as about 20 micrometers or more.

Although by no means required, the surface of the substrate may be treated. For example, in one embodiment, the surface may be roughened, such as by washing, etching, blasting, etc. In certain embodiments, the current collector may contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. If desired, the whiskers may optionally project from a seed portion that is embedded within the substrate. Similar to the whiskers, the seed portion may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

The electrodes used in the ultracapacitor also contain carbonaceous materials that are coated onto opposing sides of the current collectors. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal, or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 micrometers or more, such as about 0.1 micrometers or more, such as about 0.5 micrometers or more, such as about 1 micrometer or more to about 30 micrometers or less, such as about 25 micrometers or less, such as about 20 micrometers or less, such as about 15 micrometers or less, such as about 10 micrometers or less. At least 90% by volume of the particles (D90 size) may likewise have a size in the range of from about 2 micrometers or more, such as about 5 micrometers or more, such as about 6 micrometers or more to about 40 micrometers or less, such as about 30 micrometers or less, such as about 20 micrometers or less, such as about 15 micrometers or less. The BET surface may also range from about 900 $m^2/g$ or more, such as about 1,000 $m^2/g$ or more, such as about 1,100 $m^2/g$ or more, such as about 1,200 $m^2/g$ or more to about 3,000 $m^2/g$ or less, such as about 2,500 $m^2/g$ or less, such as about 2,000 $m^2/g$ or less, such as about 1,800 $m^2/g$ or less, such as about 1,500 $m^2/g$ or less.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, such as about 40 vol. % or less, such as about 30 vol. % or less, such as about 20 vol. % or less, such as about 15 vol. % or less, such as about 10 vol. % or less, such as about 5 vol. % or less of the total pore volume. The amount of pores less than about 2 nanometers in size (i.e., "micropores") may provide a pore volume of about 0 vol % or more, such as about 0.1 vol % or more, such as about 0.5 vol % or more, such as 1 vol % or more of the total pore volume. The amount of pores between about 2 nanometers and about 50 nanometers in size (i.e., "mesopores") may likewise be about 20 vol. % or more, such as about 25 vol. % or more, such as about 30 vol. % or more, such as about 35 vol. % or more, such as about 40 vol. % or more, such as about 50 vol. % or more of the total pore volume. The amount of pores between about 2 nanometers and about 50 nanometers in size (i.e., "mesopores") may be about 90 vol. % or less, such as about 80 vol. % or less, such as about 75 vol. % or less, such as about 65 vol. % or less, such as about 55 vol. % or less, such as about 50 vol. % or less of the total pore volume. Finally, the amount of pores greater than about 50 nanometers in size (i.e., "macropores") may be about 1 vol. % or more, such as about 5 vol. % or more, such as about 10 vol. % or more, such as about 15 vol. % or more of the total pore volume. The amount of pores greater than about 50 nanometers in size (i.e., "macropores") may be about 50 vol. % or less, such as about 40 vol. % or less, such as about 35 vol. % or less, such as about 30 vol. % or less, such as about 25 vol. % or less of the total pore volume. The total pore volume of the carbon particles may be in the range of from about 0.2 $cm^3/g$ or more, such as about 0.4 $cm^3/g$ or more, such as about, 0.5 $cm^3/g$ or more to about 1.5 $cm^3/g$ or less, such as about 1.3 $cm^3/g$ or less, such as about 1.0 $cm^3/g$ or less, such as about 0.8 $cm^3/g$ or less. The median pore width may be about 8 nanometers or less, such as about 5 nanometers or less, such as about 4 nanometers or less. The median pore width may be about 1 nanometer or more, such as about 2 nanometers or more. The pore sizes and total pore volume may be measured using nitrogen adsorption and analyzed by the Barrett-Joyner-Halenda ("BJH") technique as is well known in the art.

One unique aspect of the present invention is that the electrodes need not contain a substantial amount of binders conventionally employed in ultracapacitor electrodes. That is, binders may be present in an amount of about 60 parts or less, such as about 40 parts or less, such as about 30 parts or less, such as about 25 parts or less, such as about 20 parts or less to about 1 part or more, such as about 5 parts or more per 100 parts of carbon in the carbonaceous coating. Binders may, for example, constitute about 15 wt. % or less, such as about 10 wt. % or less, such as about 8 wt. % or less, such as about 5 wt. % or less, such as about 4 wt. % or less of the total weight of the carbonaceous coating. The binders may constitute about 0.1 wt. % or more, such as about 0.5 wt. % or more, such as about 1 wt. % or more of the total weight of the carbonaceous coating.

Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polyvinylpyrrolidone, polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose, ammonium carboxymethyl cellulose.

If desired, other materials may also be employed within an activated carbon layer of the carbonaceous materials. For example, in certain embodiments, a conductivity promoter may be employed to further increase electrical conductivity. Exemplary conductivity promoters may include, for instance, carbon black, graphite (natural or artificial), carbon nanotubes, nanowires or nanotubes, metal fibers, graphenes, etc., as well as mixtures thereof. Carbon black is particularly suitable in one embodiment. In another embodiment, carbon nanotubes are particularly suitable. When employed, conductivity promoters typically constitute about 60 parts or less, such as about 40 parts or less, such as about 30 parts or less, such as about 25 parts or less, such as about 20 parts or less to about 1 part or more, such as about 5 parts or more per 100 parts of carbon in the carbonaceous coating. Conductivity promoters may, for example, constitute about 15 wt. % or less, such as about 10 wt. % or less, such as about 8 wt. % or less, such as about 5 wt. % or less, such as about 4 wt. % or less of the total weight of the carbonaceous coating. The conductivity promoters may constitute about 0.1 wt. % or more, such as about 0.5 wt. % or more, such as about 1 wt. % or more of the total weight of the carbonaceous coating. Meanwhile, activated carbon particles likewise typically constitute 85 wt. % or more, such as about 90 wt. % or more, such as about 95 wt. % or more, such as about 97 wt. % or more of the total weight of the carbonaceous coating. The activated carbon particles may constitute less than 100 wt. %, such as about 99.5 wt. % or less, such as about 99 wt. % or less, such as about 98 wt. % or less of the total weight of the carbonaceous coating.

The particular manner in which a carbonaceous material is coated onto the sides of a current collector may vary as is well known to those skilled in the art, such as printing (e.g., rotogravure), spraying, slot-die coating, drop-coating, dip-coating, etc. In this regard, the electrodes may be formed by laminating a carbonaceous material, including a carbon film, on a current collector. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendared) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

Separator

As indicated above, the electrode assembly may include a separator positioned between the first electrode and the second electrode. The separator can enable electrical isolation of one electrode from another to help prevent an electrical short but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. In addition, it should be understood that hybrid separators may also be utilized. For instance, such separators may include two or more different materials, either blended together or in the form of a multilayer laminate. These materials may include any of the aforementioned as well as any others generally known in the art.

Regardless of the particular materials employed, the separator typically has a thickness of about 150 micrometers or less, such as about 100 micrometers or less, such as about 80 micrometers or less, such as about 50 micrometers or less, such as about 40 micrometers or less, such as about 30 micrometers or less. The separator may have a thickness of about 1 micrometer or more, such as about 5 micrometers or more, such as about 10 micrometers or more, such as about 20 micrometers or more.

Electrolyte System

While the present disclosure is generally directed to an ultracapacitor, in one embodiment, it may also be directed to an electrolyte system as defined herein. Nevertheless, the ultracapacitor may also include an electrolyte system employed within the housing. As indicated herein, the electrolyte system includes a solvent, an ionic liquid, and a lithium metal salt. The electrolyte system is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, such as about 200° C. or more, such as about 225° C. or more, such as about 250° C. or more, such as about 275° C. or more. The boiling temperature may be about 400° C. or less, such as about 375° C. or less, such as about 350° C. or less, such as about 325° C. or less, such as about 300° C. or less, such as about 275° C. or less, such as about 250° C. or less.

As indicated herein, the electrolyte system includes at least a solvent. The solvent includes a first sulfur-containing compound and a second sulfur-containing compound. In some embodiments, the solvent may consist of or consist essentially of the first sulfur-containing compound and the second sulfur-containing compound. In some embodiments, the solvent may include a third sulfur-containing compound. For instance, the sulfur-containing compound may include a sulfolane, a sulfone, a sulfoxide, a sulfide, or a sulfite. In one embodiment, the sulfur-containing compound may include a sulfolane, a sulfone, or a sulfoxide. In a further embodiment, the sulfur-containing compound may include a sulfolane or a sulfone.

In one embodiment, at least one sulfur-containing compound may be a sulfolane. In general, a sulfolane may have the following general structure:

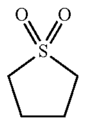

The sulfolane derivatives may include compounds wherein one or more of the hydrogen atoms is replaced by an organic radical, which may contain a polar grouping and more specifically may contain oxygen, nitrogen, sulfur and/or halide atoms. Sulfolane derivatives containing oxygen include hydroxy sulfolanes, sulfolanyl-ethers and -esters; sulfolane derivatives containing nitrogen include sulfolanyl-amines, -nitriles and nitro sulfolanes; sulfolane derivatives containing sulfur include sulfolanyl sulfides, -sulfoxides and -sulfones.

Some specific sulfolane derivatives include, but are not limited to, hydrocarbon-substituted sulfolanes such as alkyl sulfolanes preferably containing not more than about 10 carbon atoms; hydroxy sulfolanes such as 3-sulfolanol, 2-sulfolanol, 3-methyl-4-sulfolanol, 3-4-sulfolanediol; sulfolanyl ethers such as methyl-3-sulfolanyl ether, propyl-3-sulfolanyl ether, allyl-3-sulfolanyl ether, butyl-3-sulfolanyl ether, crotyl-3-sulfolanyl ether, isobutyl-3-sulfolanyl ether, methallyl-3-sulfolanyl ether, methyl vinyl carbinyl-3-sulfolanyl ether, amyl-3-sulfolanyl ether, hexyl-3-sulfolanyl ether, octyl-3-sulfolanyl ether, nonyl-3-sulfolanyl ether, glycerol alpha-gamma-diallyl-beta-3-sulfolanyl ether, tetrahydrofurfuryl-3-sulfolanyl ether, 3,3,5-tetramethyl-cyclohexyl-3-sulfolanyl ether, m-cresyl-3-sulfolanyl ethers, corresponding 2-sulfolanyl ethers, disulfolanyl ethers; sulfolanyl esters such as 3-sulfolanyl actetate, 3-sulfolanyl-caproate, sulfolanyllaurate, sulfolanylpalmitate, sulfolanyl-stearate, sulfolanyloleate, sulfolanylpropionate, sulfolanyl-butyrate; N-sulfolanes such as 3-sulfolanylamine, N-methyl-3-sulfolanylamine, N-ethyl-3-sulfolanylamine, N—N-dimethyl-3-sulfolanylamine, N-allyl-3-sulfolanylamine, N-butyl-3-sulfolanylamine, N-octyl-3-sulfolanylamine; sulfolanyl sulfides such as ethyl-3tertiary butyl-3-sulfolanyl sulfide, isobutyl-3-sulfolanyl sulfide, methallyl-3-sulfolanyl sulfide, di-3-sulfolanyl sulfide; sulfolanyl sulfones such as methyl-3-sulfolanyl sulfone, ethyl-3-sulfolanyl sulfone, propyl-3-sulfolanyl sulfone, amyl-3-sulfolanyl sulfone; and sulfolanyl halides such as 3-chloro-sulfolanyl halide, 3-4-dichloro-sulfolanyl halide, 3-chloro-4-methyl sulfolanes.

In one embodiment, the sulfolane may simply be sulfolane having the aforementioned structure. In this regard, the sulfolane may not be a sulfolane derivative.

In one embodiment, at least one sulfur-containing compound may be a sulfone. For instance, the sulfone may have the following general structure:

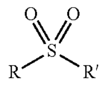

wherein R and R' are an optionally substituted hydrocarbyl moiety. Generally, "hydrocarbyl" means a hydrocarbon substituent including aliphatic (straight-chain and branched-chain) and cyclic, such as alicyclic, and aromatic groups. For instance, the hydrocarbyl moiety may be an alkyl or an aryl.

In one embodiment, the hydrocarbyl moiety may be unsubstituted. In another embodiment, the hydrocarbyl moiety may be substituted. The moiety may include from 1 to 5 and, in some embodiments, 1 to 3 or 1 to 2 substituents. The substitution may include, but is not limited to, alkoxy, alkyl, amino, aryl, carboxyl, carboxyl ester, cyano, cycloalkyl, halo, hydroxy, nitro, oxo, sulfate, sulfonyl, thiol, etc. However, it should be understood that other substituent groups may also be utilized for substitutions. Furthermore, it should be understood that such substituent groups themselves may also include further substitutions. In one embodiment, the hydrocarbyl moiety may be an alkyl substituted with an aryl. Similarly, the hydrocarbyl moiety may be an aryl substituted with an alkyl.

In one embodiment, the sulfone may be referred to as an alkyl sulfone or a dialkyl sulfone. For instance, R and R' may each independently be an alkyl group. The alkyl group may be a straight chain, branched chain, or cyclic monovalent saturated aliphatic hydrocarbyl group. The alkyl may have from 1 to 10 carbon atoms, such as from 1 to 6 carbon atoms, such as from 1 to 5 carbon atoms, such as from 1 to 4 carbon atoms, such as from 1 to 3 carbon atoms, such as from 1 to 2 carbon atoms, such as 1 carbon atom. The alkyl in one embodiment may be methyl.

In one embodiment, both R and R' may be different. In another embodiment, both R and R' may be the same. For example, they may both be alkyl. Even further, they may both be methyl.

The sulfone may include, but is not limited to, dimethyl sulfone, ethyl methyl sulfone, dipropyl sulfone, ethyl propyl sulfone, diethyl sulfone, dibutyl sulfone, propyl methyl sulfone, diisopropyl sulfone, isopropyl methyl sulfone, isopropyl ethyl sulfone, and combinations thereof. In this regard, in one embodiment, the sulfone may be dimethyl sulfone.

In one embodiment, at least one sulfur-containing compound may be a sulfoxide. In general, a sulfoxide may have the following general structure:

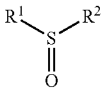

wherein $R^1$ and $R^2$ are an optionally substituted hydrocarbyl moiety. Generally, "hydrocarbyl" means a hydrocarbon substituent including aliphatic (straight-chain and branched-chain) and cyclic, such as alicyclic, and aromatic groups. For instance, the hydrocarbyl moiety may be an alkyl or an aryl.

In one embodiment, the hydrocarbyl moiety may be unsubstituted. In another embodiment, the hydrocarbyl moiety may be substituted. The moiety may include from 1 to 5 and, in some embodiments, 1 to 3 or 1 to 2 substituents. The substitution may include, but is not limited to, alkoxy, alkyl, amino, aryl, carboxyl, carboxyl ester, cyano, cycloalkyl, halo, hydroxy, nitro, oxo, sulfate, sulfonyl, thiol, etc. However, it should be understood that other substituent groups may also be utilized for substitutions. Furthermore, it should be understood that such substituent groups themselves may also include further substitutions. In one embodiment, the hydrocarbyl moiety may be an alkyl substituted with an aryl. Similarly, the hydrocarbyl moiety may be an aryl substituted with an alkyl.

In one embodiment, the sulfoxide may be referred to as an alkyl sulfoxide or a dialkyl sulfoxide. For instance, $R^1$ and $R^2$ may each independently be an alkyl group. The alkyl group may be a straight chain, branched chain, or cyclic monovalent saturated aliphatic hydrocarbyl group. The alkyl may have from 1 to 10 carbon atoms, such as from 1 to 6 carbon atoms, such as from 1 to 5 carbon atoms, such as from 1 to 4 carbon atoms, such as from 1 to 3 carbon atoms, such as from 1 to 2 carbon atoms, such as 1 carbon atom. The alkyl in one embodiment may be methyl.

In one embodiment, both $R^1$ and $R^2$ may be different. In another embodiment, both $R^1$ and $R^2$ may be the same. For example, they may both be alkyl. Even further, they may both be methyl. In this regard, such sulfoxide may be a dimethyl sulfoxide.

In one embodiment, at least one sulfur-containing compound may be a sulfide. In general, a sulfide is an inorganic anion of sulfur with the formula $S^{2-}$ or a compound containing one or more $S^{2-}$ ions.

The sulfide may include, but is not limited to, dimethyl sulfide, butyl sulfide, dibutyl sulfide, dipropyl sulfide, dioctyl sulfide, dibenzyl sulfide, diphenyl sulfide, ethylene sulfide, ethyl sulfide, methyl phenyl sulfide, ethyl vinyl sulfide, and combinations thereof.

In one embodiment, at least one sulfur-containing compound may be a sulfite. In general, a sulfite is a compound containing a sulfite ion $SO_3^2$.

The sulfite may include, but is not limited to, ethylene sulfite, 1,3-propylene sulfite, 1,2-propyleneglycol sulfite, dimethyl sulfite, vinyl ethylene sulfite, trimethylene sulfite, and combinations thereof.

Aside from the sulfur-containing compounds, the solvent may include other solvents generally known in the art. For instance, the solvent may further include, but is not limited to, cyclic carbonate solvents (e.g., ethylene carbonate, propylene carbonate, butylene carbonate, vinylene carbonate, etc.), open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, benzonitrile etc.), amides (e.g., N,N-dimethylformamide, N,N-diethylacetamide, N-methylpyrrolidinone), alkanes (e.g., nitromethane, nitroethane, etc.), and so forth.

The electrolyte system also contains at least one ionic liquid, which may be dissolved in the solvent. While the concentration of the ionic liquid can vary, it is typically desired that the ionic liquid is present at a relatively high concentration. For example, the ionic liquid may be present in an amount of about 0.5 moles per liter (M) of the electrolyte or more, such as about 0.8 M or more, such as about 1.0 M or more, such as about 1.2 M or more, such as about 1.3 M or more, such as about 1.5 M or more. The ionic liquid may be present in an amount of about 3.0 M or less, such as about 2.5 M or less, such as about 2.0 M or less, such as about 1.8 M or less, such as about 1.5 M or less, such as about 1.4 M or less, such as about 1.3 M or less.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C.

The salt contains a cationic species and counterion. The cationic species contains a compound having at least one heteroatom (e.g., nitrogen or phosphorous) as a "cationic center." In this regard, the ionic liquid may include an organoquaternary ammonium compound, organoquaternary phosphonium compound, or a mixture thereof. Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. the organoquaternary ammonium (or phosphonium) compounds may be a compound having only an aliphatic chain, an alicyclic compound having an aliphatic chain and an aliphatic ring, and a spiro compound having only aliphatic rings. It should be noted that the spiro compound is a compound having a structure in which two rings share one atom of a tetrahedron structure.

In one particular embodiment, for example, the cationic species may be an N-spirobicyclic compound, such as symmetrical or asymmetrical N-spirobicyclic compounds having cyclic rings. One example of such a compound has the following structure:

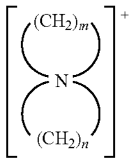

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis (pentafluoroethyl-sulfonyl)imide, bis (trifluoromethylsulfonyl)imide, bis(trifluoromethyl)imide, etc.); borates (e.g., tetrafluoroborate, tetracyanoborate, bis [oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing. In some embodiments, the counterion that may construct the salt may be exemplified by $PF_6^-$, $BF_4^-$, $N(CF_3SO_3)_2^-$, and $C(CF_3SO_3)_3^-$.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, 5-azoniaspiro[4.4]nonane tetrafluoroborate (spiro-(1,1')-bipyrrolidinium: SBP-$BF_4$), 6-azoniaspiro[5.5]undecane tetrafluoroborate, 3-azoniaspiro [2.6]nonane tetrafluoroborat, 1,1-dimethylpyrrolidinium tetrafluoroborate, etc. Further, examples of the quaternary phosphonium based ionic liquids include 5-phosphonylspiro [4.4]nonane tetrafluoroborate. In this regard, a particular suitable ionic liquid may include a tetrafluoroborate spiro quaternary compound, such as a tetrafluoroborate spiro quaternary ammonium and/or a tetrafluoroborate spiro quaternary phosphonium.

In one embodiment, the ionic liquid may include a cyclic compound. For instance, as indicated above, the ionic liquid may include a spiro compound. However, it should be understood that the ionic liquid may not include a spiro compound yet may include a cyclic compound (e.g., a pyrrolidinium, such as 1,1-dimethylpyrrolidinium tetrafluoroborate).

Furthermore, as indicated herein, the electrolyte system includes a lithium metal salt. For instance, a non-limiting list of suitable lithium metal salts that can be utilized include $LiCF_3SO_3$, $LIN(CF_3SO_2)_2$, $LiNO_3$, LIF, $LiPF_6$, $LIBF_4$, LiI, LiBr, LISCN, $LiClO_4$, $LiAlCl_4$, LIB $(C_2O_4)_2$, $LiB(C_6H_5)_4$, $LiBF_2$ $(C_2O_4)$, $LIN(SO_2F)_2$, $LiPF_3(C_2F_5)_3$, $LiPF_4$ $(CF_3)_2$, $LiPF_4$ $(C_2O_4)$, $LiPF_3(CF_3)_3$, $LiSO_3CF_3$, $LiAsF_6$, and mixtures thereof. In one particular embodiment, the lithium metal salt may include LiF.

In one embodiment, the lithium metal salt may include one having a fluorine atom. For instance, the lithium metal salt may include a fluoride. In particular, the lithium metal salt may include lithium fluoride.

The electrolyte system as disclosed herein may have a particular melting point. For instance, in one embodiment, the electrolyte system may be a liquid at room temperature. In this regard, the melting point may be −70° C. or more, such as −60° C. or more, such as −50° C. or more, such as −40° C. or more, such as −30° C. or more, such as −20° C. or more, such as −10° C. or more, such as 0° C. or more, such as 10° C. or more, such as 20° C. or more, such as 30° C. or more, such as 40° C. or more, such as 50° C. or more, such as 60° C. or more, such as 70° C. or more, such as 80° C. or more, such as 90° C. or more. The melting point may be 120° C. or less, such as 110° C. or less, such as 100° C. or less, such as 90° C. or less, such as 80° C. or less, such as 70° C. or less, such as 60° C. or less, such as 50° C. or less, such as 40° C. or less, such as 30° C. or less, such as 20° C. or less, such as 10° C. or less, such as 0° C. or less, such as −10° C. or less, such as −20° C. or less.

In the electrolyte system, the solvent may constitute a majority based on the weight of the system. For instance, the solvent may constitute 40 wt. % or more, such as 45 wt. % or more, such as 50 wt. % or more, such as 55 wt. % or more, such as 60 wt. % or more, such as 65 wt. % or more, such as 70 wt. % or more of the electrolyte system. The solvent may constitute less than 100 wt. %, such as 90 wt. % or less, such as 85 wt. % or less, such as 80 wt. % or less, such as 75 wt. % or less, such as 70 wt. % or less, such as 65 wt. % or less, such as 60 wt. % or less, such as 55 wt. % or less, such as 50 wt. % or less of the electrolyte system.

As indicated above, the solvent includes at least a first sulfur-containing compound and a second-sulfur containing compound. In this regard, the first sulfur-containing compound may be present in the electrolyte system in an amount of 30 wt. % or more, such as 35 wt. % or more, such as 40 wt. % or more, such as 45 wt. % or more, such as 50 wt. % or more, such as 55 wt. % or more, such as 60 wt. % or more based on the weight of the electrolyte system. The first sulfur-containing compound may be present in the electrolyte system in an amount 85 wt. % or less, such as 80 wt. % or less, such as 75 wt. % or less, such as 70 wt. % or less, such as 65 wt. % or less, such as 60 wt. % or less, such as 55 wt. % or less, such as 50 wt. % or less, such as 45 wt. % or less based on the weight of the electrolyte system.

The second sulfur-containing compound may be present in the electrolyte system in an amount of 2 wt. % or more, such as 5 wt. % or more, such as 8 wt. % or more, such as 10 wt. % or more, such as 13 wt. % or more, such as 15 wt. % or more, such as 18 wt. % or more, such as 20 wt. % or more, such as 25 wt. % or more, such as 30 wt. % or more based on the weight of the electrolyte system. The second sulfur-containing compound may be present in the electrolyte system in an amount 85 wt. % or less, such as 80 wt. % or less, such as 75 wt. % or less, such as 70 wt. % or less, such as 65 wt. % or less, such as 60 wt. % or less, such as 55 wt. % or less, such as 50 wt. % or less, such as 45 wt. % or less such as 40 wt. % or less, such as 35 wt. % or less, such as 30 wt. % or less, such as 26 wt. % or less, such as 24 wt. % or less, such as 20 wt. % or less, such as 18 wt. % or less, such as 16 wt. % or less, such as 14 wt. % or less, such as 12 wt. % or less based on the weight of the electrolyte system.

The first sulfur-containing compound may constitute a majority of the solvent. For instance, the first sulfur-containing compound may be present in an amount of 50 wt. % or more, such as 55 wt. % or more, such as 60 wt. % or more, such as 65 wt. % or more, such as 70 wt. % or more, such as 75 wt. % or more, such as 80 wt. % or more, such as 85 wt. % or more, such as 90 wt. % or more, such as 95 wt. % or more based on the weight of the solvent. The first sulfur-containing compound may be present in an amount of less than 100 wt. %, such as 95 wt. % or less, such as 90 wt. % or less, such as 85 wt. % or less, such as 80 wt. % or less, such as 75 wt. % or less, such as 70 wt. % or less, such as 65 wt. % or less, such as 60 wt. % or less based on the weight of the solvent.

Accordingly, the second sulfur-containing compound may constitute a minority of the solvent. For instance, the second sulfur-containing compound may be present in an amount of 50 wt. % or less (such as less than 50 wt. %), such as 45 wt. % or less, such as 40 wt. % or less, such as 35 wt. % or less, such as 30 wt. % or less, such as 25 wt. % or less, such as 20 wt. % or less, such as 15 wt. % or less based on the weight of the solvent. The second sulfur-containing compound may be present in an amount more than 0 wt. %, such as 2 wt. % or more, such as 5 wt. % or more, such as 8 wt. % or more, such as 10 wt. % or more, such as 15 wt. % or more, such as 20 wt. % or more, such as 25 wt. % or more, such as 30 wt. % or more, such as 35 wt. % or more, such as 40 wt. % or more based on the weight of the solvent.

Further, the solvent may include the first sulfur-containing compound and the second sulfur-containing compound in an amount of 80 wt. % or more, such as 85 wt. % or more, such as 90 wt. % or more, such as 93 wt. % or more, such as 95 wt. % or more, such as 96 wt. % or more, such as 97 wt. % or more, such as 98 wt. % or more, such as 99 wt. % or more, such as 99.5 wt. % or more based on the weight of the solvent. For instance, the solvent may include the first sulfur-containing compound and the second sulfur-containing compound in an amount of more than 90 wt. % based on the weight of the solvent.

As indicated herein, the electrolyte system may be non-aqueous.

Accordingly, water may not be present. In this regard, water may be present in an amount of 1 wt. % or less, such as 0.8 wt. % or less, such as 0.6 wt. % or less, such as 0.5 wt. % or less, such as 0.4 wt. % or less, such as 0.3 wt. % or less, such as 0.2 wt. % or less, such as 0.1 wt. % or less, such as 0.09 wt. % or less, such as 0.08 wt. % or less, such as 0.07 wt. % or less, such as 0.06 wt. % or less, such as 0.05 wt. % or less, such as 0.04 wt. % or less, such as 0.03 wt. % or less, such as 0.02 wt. % or less, such as 0.01 wt. % or less, such as 0.009 wt. % or less, such as 0.008 wt. % or less, such as 0.007 wt. % or less, such as 0.006 wt. % or less, such as 0.005 wt. % or less based on the weight of the electrolyte system.

Regardless of the number of solvents present within the electrolyte system, it should be understood that the total weight percentage of all of the solvents should be about 100 wt. % based on the combination of the solvents present within the electrolyte system.

In addition, the ionic liquid and the metal salt may comprise less of the electrolyte system than the solvent. For instance, the ionic liquid may be present in an amount of 10 wt. % or more, such as 15 wt. % or more, such as 20 wt. % or more, such as 25 wt. % or more, such as 30 wt. % or more, such as 35 wt. % or more, such as 40 wt. % or more based on the weight of the electrolyte system. The ionic liquid may be present in an amount of 55 wt. % or less, such as 50 wt. % or less, such as 45 wt. % or less, such as 40 wt. % or less, such as 35 wt. % or less, such as 30 wt. % or less based on the weight of the electrolyte system.

The metal salt may be present in the electrolyte system in a small amount. For instance, the metal salt may be present in an amount of 1 wt. % or less, such as 0.8 wt. % or less, such as 0.6 wt. % or less, such as 0.5 wt. % or less, such as 0.4 wt. % or less, such as 0.3 wt. % or less, such as 0.2 wt. % or less, such as 0.1 wt. % or less, such as 0.09 wt. % or less, such as 0.08 wt. % or less, such as 0.07 wt. % or less, such as 0.06 wt. % or less, such as 0.05 wt. % or less, such as 0.04 wt. % or less, such as 0.03 wt. % or less, such as 0.02 wt. % or less, such as 0.01 wt. % or less, such as 0.009 wt. % or less, such as 0.008 wt. % or less, such as 0.007 wt. % or less, such as 0.006 wt. % or less, such as 0.005 wt. % or less based on the weight of the electrolyte system. The metal salt may be present in an amount of more than 0 wt. %, such as 0.0001 wt. % or more, such as 0.0002 wt. % or more, such as 0.0003 wt. % or more, such as 0.0004 wt. % or more, such as 0.0005 wt. % or more, such as 0.0006 wt. % or more, such as 0.0007 wt. % or more, such as 0.0008 wt. % or more, such as 0.0009 wt. % or more, such as 0.001 wt. % or more, such as 0.002 wt. % or more, such as 0.003 wt. % or more, such as 0.004 wt. % or more, such as 0.005 wt. % or more, such as 0.006 wt. % or more, such as 0.007 wt. % or more, such as 0.008 wt. % or more, such as 0.009 wt. % or more, such as 0.01 wt. % or more based on the weight of the electrolyte system.

Housing

The ultracapacitor of the present invention is not necessarily limited and can be produced in a shape such as a film type, a coin type, a cylindrical type, an oval (non-cylindrical) shape, and a box shape, and is not particularly limited. For instance, examples of these ultracapacitors includes cylindrical cells, prismatic cells, surface mountable cells, etc.

The ultracapacitor of the present invention employs a housing within which the electrode assembly and the electrolyte system are retained. The manner in which the components are inserted into the housing may vary as is known in the art. For example, the electrodes and separator may be initially folded, wound, stacked, or otherwise contacted together to form an electrode assembly. The electrolyte may optionally be immersed into the electrodes of the assembly. In one particular embodiment, the electrodes and separator may be wound into an electrode assembly having a "jelly-roll" configuration. For example, the electrode assembly may include a jellyroll electrode assembly that contains a first electrode, a second electrode, and a separator positioned between the electrodes. In one embodiment, the electrode assembly may also include another separator that is positioned over the second electrode. In this manner, each of two coated surfaces of the electrodes is separated by a separator, thereby maximizing surface area per unit volume and capacitance. While by no means required, the electrodes can be offset in this embodiment so as to leave their respective contact edges extending beyond first and second edges of the first and second separators, respectively. Among other things, this can help prevent "shorting" due to the flow of electrical current between the electrodes. However, it should be understood that other configurations may also be utilized. For instance, in another embodiment, the electrodes, separator, and optional electrolyte may be provided as an electrode assembly having a laminar configuration.

Furthermore, the jellyroll may be provided in a circular/cylindrical configuration in one embodiment. In another embodiment, the jellyroll may be provided in a relatively flatter circular/cylindrical (or oval) configuration.

As indicated herein, the components may be provided within the housing of the ultracapacitor and optionally hermetically sealed. The nature of the housing may vary as desired. In certain embodiments, for example, the housing may contain a container that encloses the components of the ultracapacitor. For example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, oval, D-shaped, etc. Cylindrically-shaped containers are particular suitable.

In other embodiments, the housing may be in the form of a package. For instance, the package may include sidewalls that extend in a direction generally perpendicular to a base to define an upper end wherein the base defines an inner surface and an outer surface. Any of a variety of different materials may be used to form the sidewalls and base, such as metals, plastics, ceramics, and so forth. In one embodiment, for example, the sidewalls and/or base may include one or more layers of a ceramic material, such as aluminum nitride, aluminum oxide, silicon oxide, magnesium oxide, calcium oxide, glass, etc., as well as combinations thereof. In other embodiments, the sidewalls and/or base may include one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth.

First and second conductive members may also be employed within the interior cavity of the housing to facilitate the connection of the electrode assembly in a mechanically stable manner. For example, a first conductive member and a second conductive member may be disposed on the inner surface of the base and extend in a plane that is generally parallel to the base. The conductive members may be provided in any form (e.g., pad, plate, frame, etc.), but generally have a relatively small thickness or to minimize the thickness of the resulting ultracapacitor. The conductive members may be formed from one or more layers of a metal, such as nickel, silver, gold, tin, copper, etc. The leads of the electrode assembly that are connected to the respective electrodes may be electrically connected to the respective conductive members. The leads may be attached using any of a variety of known techniques, such as welding, laser welding, conductive adhesives, etc.

The first and second conductive members may be electrically connected to first and second external terminations, respectively, which may be provided on the outer surface of the base and extend in a plane that is generally parallel to the base. The terminations may be provided in any form (e.g., pad, plate, frame, etc.), but generally have a relatively small thickness or to minimize the thickness of the resulting ultracapacitor and improve its ability to be surface mounted to a circuit board. The terminations may be formed from one or more layers of a metal, such as nickel, silver, gold, tin, copper, etc. If desired, the surface of the terminations may be electroplated with nickel, silver, gold, tin, etc. as is known in the art to ensure that the final part is mountable to the circuit board. In one particular embodiment, the termination (s) may be deposited with nickel and silver flashes, respectively, and the mounting surface is also plated with a tin solder layer. In another embodiment, the termination(s) may be deposited with thin outer metal layers (e.g., gold) onto a base metal layer (e.g., copper alloy) to further increase conductivity.

Regardless of the manner in which they are formed, the first and second external terminations may be electrically connected to the first and second conductive members, respectively, to provide the desired connection with the electrode assembly. In one embodiment, for instance, the conductive members may simply extend through the base to form the external terminations.

Alternatively, a separate conductive trace may be attached to the first conductive member that extends through the base and either forms the first external termination or is connected to an additional conductive member that serves as the external termination. Similarly, the second conductive member may extend through the base to form the external termination, or a separate conductive trace (not shown) may be attached to the second conductive member that extends through the base and either forms the termination or is connected to an additional conductive member that serves as the termination. When traces are employed, a via may be formed within the base to accommodate the trace.

The manner in which the conductive members and external terminations may be electrically connected may vary as is known in the art. In certain embodiments, for example, welding techniques may be employed, such as ultrasonic welding, laser welding, resistance welding, etc. In yet other embodiments, a conductive adhesive may be employed to connect the conductive members to respective terminations.

Once connected in the desired manner, the electrode assembly may then be sealed within the housing. For instance, the ultracapacitor may also include a lid that is positioned on the upper end of the sidewalls after the electrode assembly is positioned within the housing. The lid may be formed from a ceramic, metal (e.g., iron, copper, nickel, cobalt, etc., as well as alloys thereof), plastic, and so forth. If desired, a sealing member (not shown) may be disposed between the lid and the sidewalls to help provide a good seal. In one embodiment, for example, the sealing member may include a glass-to-metal seal, Kovar® ring (Goodfellow Camridge, Ltd.), etc. The height of the sidewalls is generally such that the lid does not contact any surface of the electrode assembly. When placed in the desired position, the lid may be sealed to the sidewalls using known techniques, such as welding (e.g., resistance welding, laser welding, etc.), soldering, etc.

The housing in one embodiment may be in the form of a flexible package that encloses the components of the ultracapacitor. In addition, the housing may also be relatively thin. For instance, to help achieve the desired thickness and volumetric efficiency, the housing is generally formed from a substrate that is relatively thin in nature, such as having a thickness of from about 20 micrometers or more, such as about 50 micrometers or more, such as about 100 micrometers or more, such as about 200 micrometers or more, such as about to about 1,000 micrometers or less, such as about 800 micrometers or less, such as about 600 micrometers or less, such as about 400 micrometers or less, such as about 200 micrometers or less.

The housing contains a substrate that may include any number of layers desired to achieve the desired level of barrier properties, such as 1 or more, in some embodiments 2 or more, and in some embodiments, from 2 to 4 layers. Typically, the substrate contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the substrate may also contain an outer layer that serves as a protective layer for the housing. In this manner, the barrier layer faces the electrochemical cells and the outer layer faces the exterior of the housing. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the substrate may also contain a sealing layer. The sealing layer may be continuous over the housing such that it faces the electrochemical cells. Alternatively, the sealing layer may be employed only at the edges of the capacitor to help seal the housing at and around the terminations. Regardless, the sealing layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth) acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth) acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

The embodiments described above generally refer to the use of a single electrode assembly in the ultracapacitor. It should of course be understood, however, that the capacitor of the present invention may also contain two or more electrode assemblies. For instance, in one such embodiment, for example, the ultracapacitor may include a stack of two or more electrode assemblies, which may be the same or different.

Properties and Applications

The ultracapacitor as disclosed herein can be utilized for various applications. For instance, the ultracapacitor may be utilized alone or may be provided as an ultracapacitor module.

In general, the ultracapacitor module includes a plurality of ultracapacitors and an enclosure for housing the plurality of ultracapacitors. The number of ultracapacitors utilized within the module are not necessarily limited by the present invention. For instance, the module may include at least 2, such as at least 4, such as at least 6, such as at least 10, such as at least 14, such as at least 18, such as at last 24, such as at last 30, such as at last 40, such as at least 50 ultracapacitors, such as at least 54 ultracapacitors. While not limited, the module may include 500 or less, such as 400 or less, such as 300 or less, such as 200 or less, such as 100 or less, such as 80 or less, such as 60 or less, such as 40 or less ultracapacitors.

The ultracapacitors within the ultracapacitor module may be connected to one another using means known in the art. For instance, the ultracapacitors may be connected using an interconnect (also referred to as a bus bar). In addition, the ultracapacitors may be electrically connected together in series or in parallel, depending on the particular properties desired. For instance, in one embodiment, the ultracapacitors may be electrically connected in series such that a terminal of a certain polarity (e.g., positive) of one ultracapacitor is connected to a terminal of opposite polarity (e.g., negative) of another ultracapacitor. Alternatively, in one embodiment, the ultracapacitors may be connected in parallel.

The type of interconnect and material utilized is not necessarily limited by the present invention. For instance, the interconnect may be formed from a variety of materials. The interconnect may comprise any suitable plastic, resin, metal, etc. so long as it is electrically conductive. In one embodiment, the interconnect is formed from a conductive material, such as a conductive metal. The conductive metal may include, but is not limited to, copper, tin, nickel, aluminum, etc., as well as alloys and/or coated metals. In one particular embodiment, the interconnect is formed from aluminum. In addition, in one embodiment, the interconnect may be relatively flat. Alternatively, the interconnect may be one having an increased surface area. Regarding the latter, the interconnect may have projections/protrusions or may also be formed from wires, braids, coils, etc.

Regardless, the ultracapacitors may be connected using an interconnect that attaches to or connects the respective terminals of the ultracapacitors. In this regard, the interconnect includes voids in which the terminals of the ultracapacitors are positioned. The interconnect surrounds the terminal allowing for electrical connection. The interconnect may be welded, such as laser welded, to the terminal of the ultracapacitors. However, it should be understood that other means may also be employed for connecting the interconnect to the terminals of the ultracapacitors. For instance, if the terminals have a screw configuration, the terminals may protrude through the voids of the interconnects whereby a nut could be utilized to connect the interconnect with the terminal and maintain structural integrity. It should be understood that in addition to the above, other means may also be utilized to secure the interconnect to the respective terminal.

The ultracapacitor module may also include an electronic board, such as a circuit board. For example, the circuit board may be a balancing circuit as generally known in the art. In general, the balancing circuit may be an active balancing circuit or a passive balancing circuit. For example, an active balancing circuit may include active components, such as a regulator. In general, a regulator can be any device that is operable to compare the input voltage with the reference voltage and provide an output. In some embodiments, the regulator can include a comparator and/or one or more switching elements provided in a single package (e.g., integrated circuit). Meanwhile, a passive balancing circuit may include passive components, such as a resistor. As indicated below, the ultracapacitors may be presented in banks. In this regard, in one embodiment, each individual bank may have its own circuit board.

The ultracapacitor module may also include a control board. The control board may include electronic components to assist with the operation of the ultracapacitor module as well as an end-use application. The control board may be secured to the ultracapacitor module. As indicated below, the ultracapacitors may be presented in banks. In this regard, in one embodiment, each individual bank may have its own control board.

The ultracapacitor module may include a switch mode power supply on its output. For instance, the ultracapacitor module may include a converter. The converter may be a buck converter, a boost converter, or a buck/boost converter. In one embodiment, the converter may be a buck/boost converter. In another embodiment, the converter may be a buck converter. In a further embodiment, the converter may be a boost converter. In this regard, if the voltage of the ultracapacitors is affected, the converter may allow for the output voltage of the ultracapacitor module to be as desired. For example, in one embodiment, the output voltage may be converted to be about 48 V.

While not limited, the ultracapacitor module may have an output (e.g., a DC output) of 12 V or more, such as 16 V or more, such as 20 V or more, such as 24 V or more, such as 30 V or more, such as 36 V or more, such as 40 V or more, such as 48 V or more. In addition, the ultracapacitor module may have an output (e.g., a DC output) of 500 V or less, such as 400 V or less, such as 300 V or less, such as 250 V or less, such as 200 V or less, such as 180 V or less, such as 150 V or less, such as 120 V or less, such as 100 V or less, such as 80 V or less, such as 60 V or less, such as 50 V or less, such as 40 V or less.

Each individual ultracapacitor may also have a certain voltage. For instance, each ultracapacitor may have a voltage of 2 V or more, such as 2.2 V or more, such as 2.5 V or more, such as 2.7 V or more, such as 3 V or more. The ultracapacitor may have a voltage of 5 V or less, such as 4 V or less, such as 3.5 V or less, such as 3.2 V or less, such as 3 V or less, such as 2.9 V or less. For instance, in one embodiment, the ultracapacitors may have a voltage of 2.7 V or 3.0 V. In one embodiment, the ultracapacitors may have a voltage of 2.7 V. In another embodiment, the ultracapacitors may have a voltage of 3.0 V.

Further, the ultracapacitor module may have a relatively high capacitance. For instance, the rated capacitance of the ultracapacitor module may be 50 F or more, such as 100 F or more, such as 200 F or more, such as 300 F or more, such as 400 F or more, such as 450 F or more, such as 500 F or more. The rated capacitance of the ultracapacitor module may be 1,000 F or less, such as 800 or less, such as 700 or less, such as 600 or less, such as 550 or less, such as 500 or less. Meanwhile, the rated capacitance of each ultracapacitor may also be relatively high. For instance, the rated capacitance of the ultracapacitor may be 50 F or more, such as 100 F or more, such as 200 F or more, such as 300 F or more, such as 500 F or more, such as 800 F or more, such as 1,000 F or more, such as 1,500 F or more, such as 2,000 F or more, such as 2,500 F or more, such as 3,000 F or more. The rated capacitance of the ultracapacitor may be 5,000 F or less, such as 4,000 F or less, such as 3,500 F or less, such as 3,000 F or less.

The ultracapacitor utilized according to the present invention may exhibit excellent electrical properties, in particular when exposed to high temperatures. For example, the ultracapacitor may exhibit a capacitance of about 6 Farads per cubic centimeter ("$F/cm^3$") or more, such as about 8 $F/cm^3$ or more, such as about 10 $F/cm^3$ or more, such as about 12 $F/cm^3$ or more, such as about 15 $F/cm^3$ or more, such as about 18 $F/cm^3$ or more. The capacitance may be 100 $F/cm^3$ or less, such as about 80 $F/cm^3$ or less, such as about 60 $F/cm^3$ or less, such as about 40 $F/cm^3$ or less, such as about 30 $F/cm^3$ or less, such as about 28 $F/cm^3$ or less, such as about 25 $F/cm^3$ or less, such as about 22 $F/cm^3$ or less, such as about 20 $F/cm^3$ or less, such as about 18 $F/cm^3$ or less, such as about 15 $F/cm^3$ or less, such as about 12 $F/cm^3$ or less. The capacitance may be measured at a voltage of 2.7V or 2.5V and a temperature of 65° C. or a voltage of 2.0 V and a temperature of 85° C.

The ultracapacitor may exhibit a capacitance of about 6 F or more, such as about 8 F or more, such as about 10 F or more, such as about 12 F or more, such as about 15 F or more, such as about 18 F or more. The capacitance may be 100 F or less, such as about 80 F or less, such as about 60 F or less, such as about 40 F or less, such as about 30 F or less, such as about 28 F or less, such as about 25 F or less, such as about 22 F or less, such as about 20 F or less, such as about 18 F or less, such as about 15 F or less, such as about 12 F or less.

The ultracapacitor may also have a low equivalence series resistance ("ESR"), such as about 500 mOhms or less, such as about 450 mOhms or less, such as about 400 mOhms or less, such as about 350 mOhms or less, such as about 300 mOhms or less, such as about 275 mOhms or less, such as about 250 mOhms or less, such as about 225 mOhms or less, such as about 200 mOhms or less, such as about 175 mOhms or less, such as about 150 mOhms or less, such as about 125 mOhms or less. The ESR may be about 0.01 mOhms or more, such as about 0.05 mOhms or more, such as about 0.1 mOhms or more, such as about 1 mOhm or more, such as about 5 mOhms or more, such as about 10 mOhms or more, such as about 25 mOhms or more, such as about 50 mOhms or more, such as about 75 mOhms or more, such as about 100 mOhms or more, such as about 125 mOhms or more, such as about 150 mOhms or more. The ESR may be measured at a voltage of 2.7V or 2.5V and a temperature of 65° C. or a voltage of 2.0 V and a temperature of 85° C.

As indicated above, the resulting ultracapacitor may exhibit a wide variety of beneficial electrical properties, such as improved capacitance and ESR values. Notably, the ultracapacitor may exhibit excellent electrical properties even when exposed to high temperatures. For example, the ultracapacitor may be placed into contact with an atmosphere having a temperature of about 65° C. or more, in some embodiments about 85° C., and in other embodiments about 105° C. and demonstrate sustained performance. The capacitance and ESR values can remain stable at such temperatures for a substantial period of time, such as for about 100 hours or more, such as about 200 hours or more, such as about 300 hours or more, such as about 500 hours or more, such as about 800 hours or more, such as about 1000 hours or more, such as about 1200 hours or more, such as about 1500 hours or more, such as about 2000 hours or more, such as about 3000 hours or more, such as about 4000 hours or more, such as about 5000 hours or more. The time period may be 10000 hours or less, such as 8000 hours or less, such as 6000 hours or less, such as 5000 hours or less, such as 4000 hours or less, such as 3000 hours or less, such as 2000 hours or less, such as 1500 hours or less, such as 1300 hours or less, such as 1100 hours or less, such as 1000 hours or less, such as 800 hours or less, such as 600 hours or less, such as 400 hours or less.

For instance, after conditioning at 65° C. for one or more of the aforementioned time periods (e.g., 100, 200, 300, 500, 800, 1000, 1200, 1500, 2000, 3000, 4000, 5000 hours), the ultracapacitor may exhibit a capacitance within 40%, such as within 30%, such as within 20%, such as within 15%, such as within 10%, such as within 5% of the initial capacitance. Similarly, the ESR may be within 60%, such as within 50%, such as within 40%, such as within 30%, such as within 20%, such as within 10%, such as within 5% of the initial ESR. In one embodiment, the aforementioned percentages may also apply when conditioning at 85° C. for one or more of the aforementioned time periods.

In one embodiment, for example, the ratio of the capacitance value of the ultracapacitor after being exposed to the hot atmosphere (e.g., 65° C. or 85° C.) for one or more of the aforementioned time periods to the capacitance value of the ultracapacitor when initially exposed to the hot atmosphere is about 0.70 or more, such as about 0.75 or more, such as about 0.8 or more, such as about 0.85 or more, such as about 0.9 or more, such as about 0.95 or more. The ratio may be 1.0 or less, such as about 0.98 or less, such as about 0.95 or less, such as about 0.9 or less. Such high capacitance values can also be maintained under various extreme conditions, such as when applied with a voltage and/or in a humid atmosphere.

The ESR can also remain stable at such temperatures for a substantial period of time, such as noted above. In one embodiment, for example, the ratio of the ESR of the ultracapacitor after being exposed to the hot atmosphere ((e.g., 65° C. or 85° C.) for one or more of the aforementioned time periods to the ESR of the ultracapacitor when initially exposed to the hot atmosphere is about 1.6 or less, such as about 1.5 or less, such as about 1.4 or less, such as about 1.3 or less, such as about 1.2 or less, such as about 1.1 or less, such as about 1.0 or less. The ratio may be about 0.2 or more, such as about 0.3 or more, such as about 0.4 or more, such as about 0.5 or more, such as about 0.6 or more, such as about 0.7 or more, such as about 0.8 or more, such as about 0.9 or more, such as about 1.0 or more. Notably, such low ESR values can also be maintained under various extreme conditions, such as when applied with a high voltage and/or in a humid atmosphere as described above.

The ultracapacitor may also have a relatively low leakage current. In general, "leakage current" is the amount of current which flows through the capacitor at a given DC voltage, for example at the rated DC voltage of the ultracapacitor. In this regard, when tested at 70° C. with an output current of 100 amps and 48 V, the maximum leakage current may be 100 mA or less, such as 80 mA or less, such as 50 mA or less, such as 45 mA or less, such as 40 mA or less, such as 30 mA or less, such as 20 mA or less, such as 10 mA or less.

Test Methods

Equivalent Series Resistance (ESR): Equivalence series resistance may be measured using a Hiller Instrument by the IEC-62391 (2022) method. A variety of temperature levels may be tested. For example, the temperature may be 23° C., 65° C., 85° C. or 105° C.

Capacitance: The capacitance may be measured using a Hiller Instrument by the IEC-62391 (2022) method. A variety of temperature levels may be tested. For example, the temperature may be 23° C., 65° C., 85° C. or 105° C.

Example 1

The ability to form an electrochemical cell in accordance with the present invention was demonstrated. Initially, an electrode assembly was prepared using electrodes formed from activated carbon particles. Once formed, the electrodes were assembled with a separator into a stack. Once the electrode stack is complete, all electrode terminals are welded to a single aluminum terminal. This assembly is then put into a plastic/aluminum/plastic laminated packaging material and all but one of the edges are heat sealed together. Next, the electrolyte system is injected into the package through the open edge. The electrolyte-filled package is then put under vacuum and the final edge is heat sealed to complete the finished package. The resulting cells were formed and tested for ESR and capacitance. The results are illustrated in FIGS. 1-5.

The first electrolyte system contained about 59% sulfolane, about 7% dimethyl sulfone, about 34% SBPBF4 by weight. The second electrolyte system contained about 59% sulfolane, about 7% dimethyl sulfone, about 34% SBPBF4, and about 0.01% lithium fluoride by weight.

Figure 2:
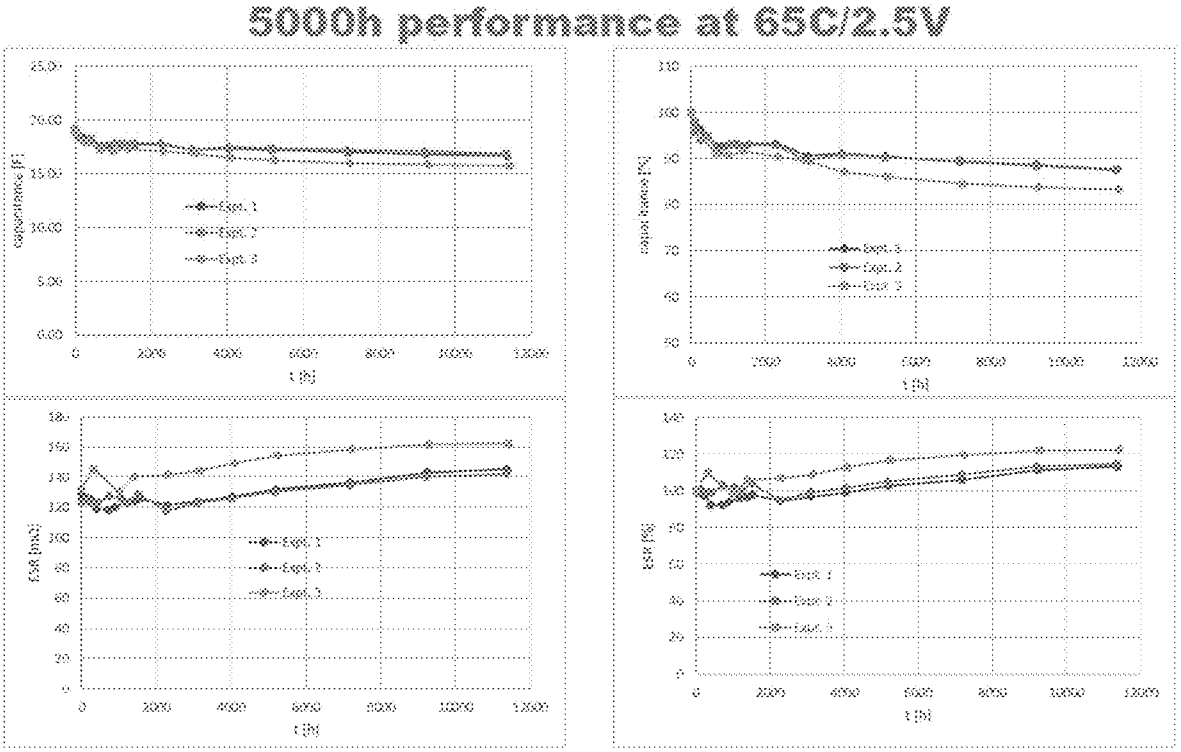
Figure 3:
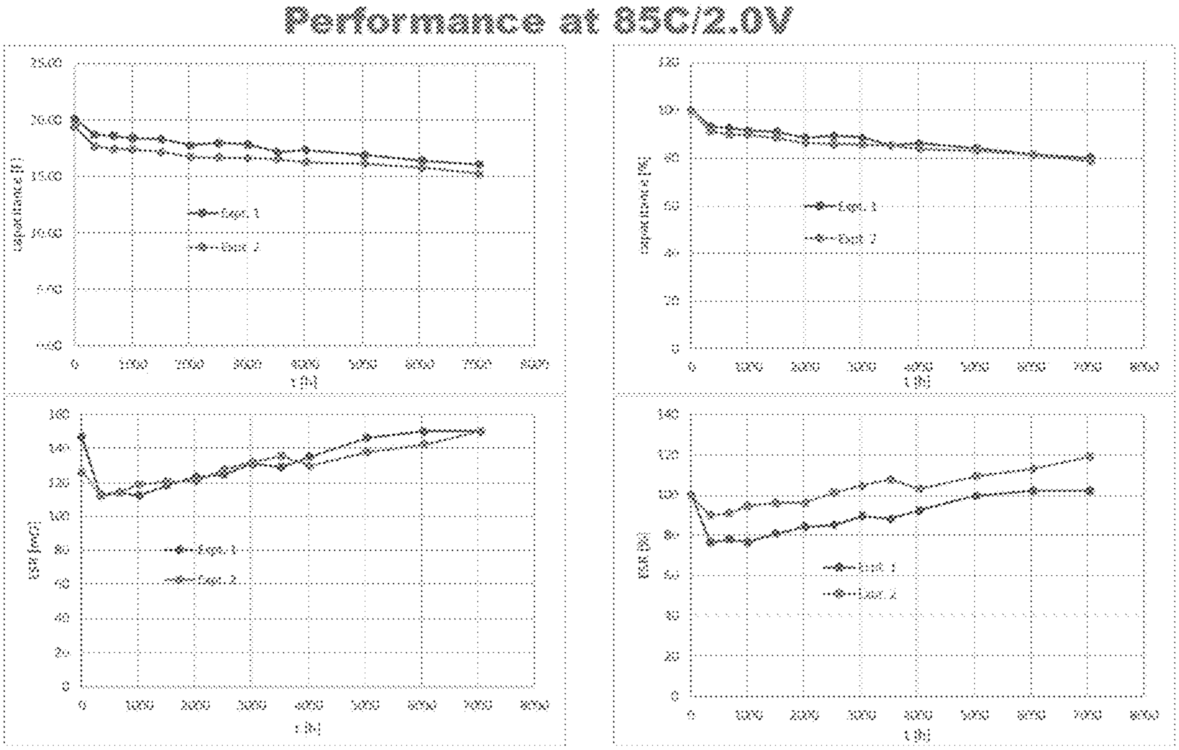
Figure 4:
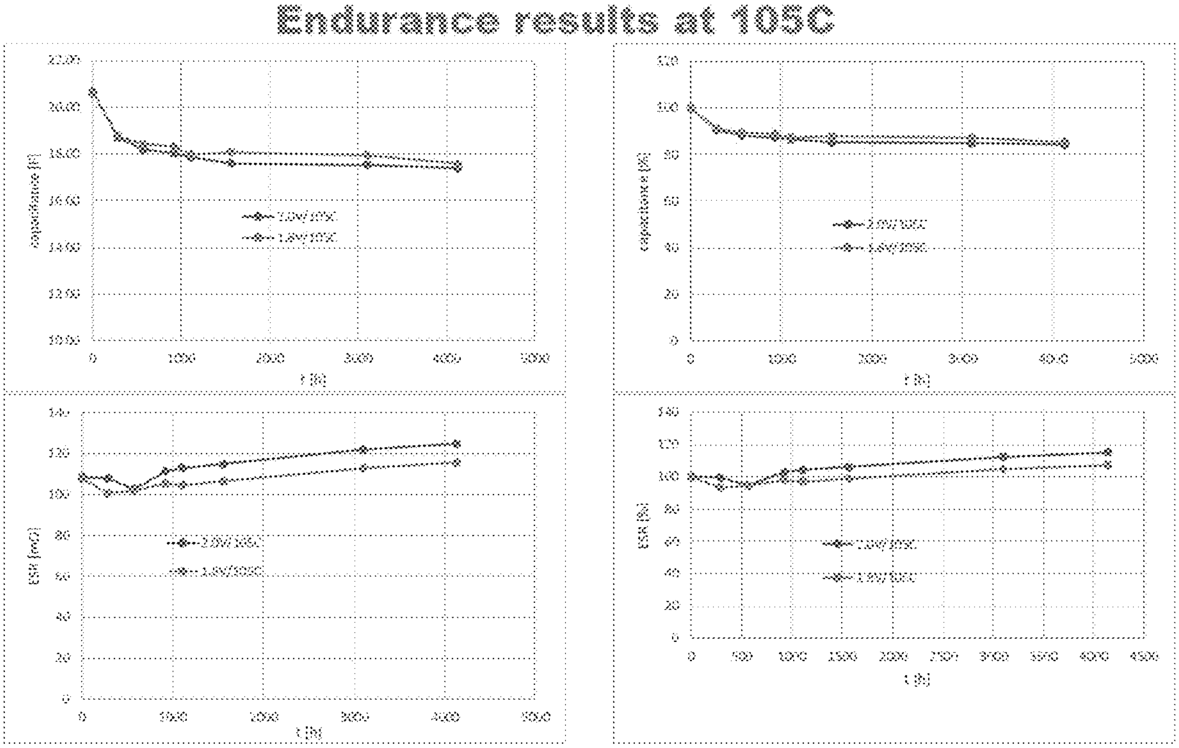
Figure 5:
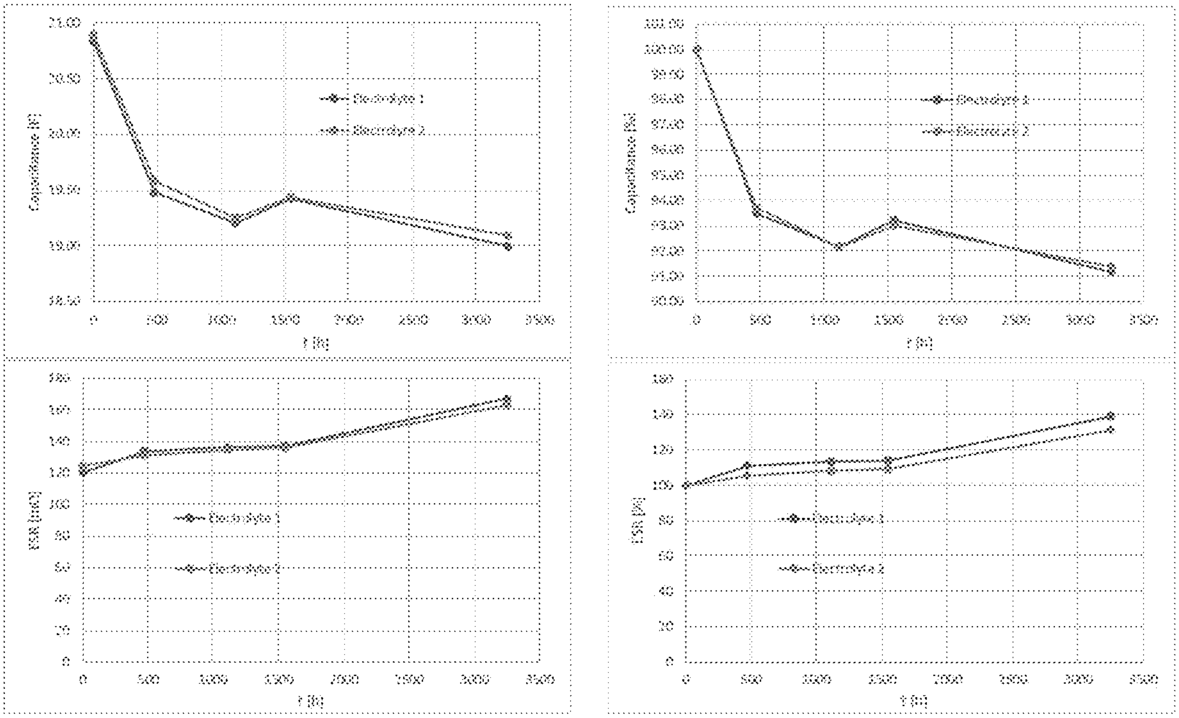
FIG. 5 illustrates the capacitance and equivalent series resistance comparison results of the first and second electrolyte systems of Example 1.

FIG. 1 demonstrates the performance of the ultracapacitor upon conditioning at 65° C. and testing (2.7V) after a duration of time. FIG. 2 demonstrates the performance of the ultracapacitor upon conditioning at 65° C. and testing (2.5V) after a duration of time. FIG. 3 demonstrates the performance of the ultracapacitor upon conditioning at 85° C. and testing (2.0V) after a duration of time. FIG. 4 demonstrates the performance of the ultracapacitor upon conditioning at 105° C. and testing after a duration of time. FIG. 5 demonstrates the performance of the ultracapacitor upon conditioning at 65° C. and testing (2.7V) after a duration of time.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. An ultracapacitor comprising:

a housing, and an electrode assembly and an electrolyte system within the housing, the electrolyte system comprising a solvent, an ionic liquid comprising a cyclic compound, and a lithium metal salt, the solvent comprising a first sulfur-containing compound in an amount of from less than 85 wt. % based on the weight of the solvent and a second sulfur-containing compound in an amount of 50 wt. % or less based on the weight of the solvent.

2. The ultracapacitor of claim 1, wherein the first sulfur-containing compound is present in an amount of from 50 wt. % or more to less than 80 wt. % based on the weight of the solvent.

3. The ultracapacitor of claim 1, wherein the second sulfur-containing compound is present in an amount of from 10 wt. % or more to 50 wt. % or less based on the weight of the solvent.

4. The ultracapacitor of claim 1, wherein the ionic liquid is present in an amount of from 10 wt. % or more to 55 wt. % or less based on the weight of the electrolyte system.

5. The ultracapacitor of claim 1, wherein the lithium metal salt is present in an amount of 0.5 wt. % or less based on the weight of the electrolyte system.

6. The ultracapacitor of claim 1, wherein the first sulfur-containing compound comprises sulfolane.

7. The ultracapacitor of claim 1, wherein the first sulfur-containing compound comprises a sulfolane derivative.

8. The ultracapacitor of claim 1, wherein the second sulfur-containing compound comprises a sulfone.

9. The ultracapacitor of claim 1, wherein the second sulfur-containing compound comprises an alkyl sulfone.

10. The ultracapacitor of claim 1, wherein the second sulfur-containing compound comprises dimethyl sulfone, ethyl methyl sulfone, dipropyl sulfone, ethyl propyl sulfone, diethyl sulfone, dibutyl sulfone, propyl methyl sulfone, diisopropyl sulfone, isopropyl methyl sulfone, isopropyl ethyl sulfone, and combinations thereof.

11. The ultracapacitor of claim 1, wherein the ionic liquid comprises an organoquaternary ammonium compound, organoquaternary phosphonium compound, or a mixture thereof.

12. The ultracapacitor of claim 1, wherein the lithium metal salt comprises $LiCF_3SO_3$, $LIN(CF_3SO_2)_2$, $LiNO_3$, LIF, $LiPF_6$, $LIBF_4$, LiI, LiBr, LiSCN, $LiClO_4$, $LiAlCl_4$, LIB $(C_2O_4)_2$, $LiB(C_6H_5)_4$, $LiBF_2$ $(C_2O_4)$, $LIN(SO_2F)_2$, $LiPF_3$ $(C_2F_5)_3$, $LiPF_4$ $(CF_3)_2$, $LiPF_4$ $(C_2O_4)$, $LiPF_3(CF_3)_3$, $LiSO_3CF_3$, $LiAsF_6$, or a mixture thereof.

13. The ultracapacitor of claim 1, wherein the lithium metal salt comprises lithium fluoride.

14. The ultracapacitor of claim 1, wherein the electrolyte system has a melting point of from −50° C. to 100° C.

15. The ultracapacitor of claim 1, wherein the electrode assembly comprises a first electrode comprising a first current collector electrically coupled to a first activated carbon coating and a second electrode comprising a second current collector electrically coupled to a second activated carbon coating, wherein the first current collector and the second current collector each contain a substrate that includes a conductive metal, and wherein a separator is positioned between the first electrode and the second electrode.

16. The ultracapacitor of claim 1, wherein a ratio of the capacitance after conditioning at 65° C. for 2000 hours and a voltage of 2.7V to the initial capacitance is about 0.8 or more and/or a ratio of the capacitance after conditioning at 85° C. for 5000 hours and a voltage of 2.0V to the initial capacitance is about 0.8 or more.

17. The ultracapacitor of claim 1, wherein the ultracapacitor has an initial ESR of 300 mOhms or less when determined at 65° C. a voltage of 2.7V and/or an initial ESR of 300 mOhms or less when determined at 85° C. a voltage of 2.0V.

18. The ultracapacitor of claim 1, wherein a ratio of the ESR after conditioning at 65° C. for 2000 hours and a voltage of 2.7V to the initial ESR is about 1.5 to 1 and/or a ratio of the ESR after conditioning at 85° C. for 5000 hours and a voltage of 2.0V to the initial ESR is about 1.5 or less.

19. An electrolyte system comprising:

a solvent, an ionic liquid comprising a cyclic compound, and a lithium metal salt, wherein the solvent comprises a first sulfur-containing compound in an amount of from less than 85 wt. % based on the weight of the solvent and a second sulfur-containing compound in an amount of 50 wt. % or less based on the weight of the solvent.

20. The electrolyte system of claim 19, wherein the first sulfur-containing compound is present in an amount of from 50 wt. % or more to less than 80 wt. % based on the weight of the solvent.

21. The electrolyte system of claim 19, wherein the second sulfur-containing compound is present in an amount of from 10 wt. % or more to 50 wt. % or less based on the weight of the solvent.

22. The electrolyte system of claim 19, wherein the ionic liquid is present in an amount of from 10 wt. % or more to 55 wt. % or less based on the weight of the electrolyte system.

23. The electrolyte system of claim 19, wherein the lithium metal salt is present in an amount of 0.5 wt. % or less based on the weight of the electrolyte system.

24. The electrolyte system of claim 19, wherein the first sulfur-containing compound comprises sulfolane.

25. The electrolyte system of claim 19, wherein the first sulfur-containing compound comprises a sulfolane derivative.

26. The electrolyte system of claim 19, wherein the second sulfur-containing compound comprises a sulfone.

27. The electrolyte system of claim 19, wherein the second sulfur-containing compound comprises an alkyl sulfone.

28. The electrolyte system of claim 19, wherein the second sulfur-containing compound comprises dimethyl sulfone, ethyl methyl sulfone, dipropyl sulfone, ethyl propyl sulfone, diethyl sulfone, dibutyl sulfone, propyl methyl sulfone, diisopropyl sulfone, isopropyl methyl sulfone, isopropyl ethyl sulfone, and combinations thereof.

29. The electrolyte system of claim 19, wherein the ionic liquid comprises an organoquaternary ammonium compound, organoquaternary phosphonium compound, or a mixture thereof.

30. The electrolyte system of claim 19, wherein the lithium metal salt comprises $LiCF_3SO_3$, $LIN(CF_3SO_2)_2$, $LiNO_3$, LIF, $LiPF_6$, $LIBF_4$, LiI, LiBr, LiSCN, $LiClO_4$, $LiAlCl_4$, LIB $(C_2O_4)_2$, $LiB(C_6H_5)_4$, $LiBF_2$ $(C_2O_4)$, LIN $(SO_2F)_2$, $LiPF_3(C_2F_5)_3$, $LiPF_4$ $(CF_3)_2$, $LiPF_4$ $(C_2O_4)$, $LiPF_3$ $(CF_3)_3$, $LiSO_3CF_3$, $LiAsF_6$, or a mixture thereof.

31. The electrolyte system of claim 19, wherein the lithium metal salt comprises lithium fluoride.

32. The electrolyte system of claim 19, wherein the electrolyte system has a melting point of from −50° C. to 100° C.

* * * * *